(12) United States Patent
Kim et al.

(10) Patent No.: US 8,148,029 B2
(45) Date of Patent: Apr. 3, 2012

(54) ELECTRODE FOR FUEL CELL AND FUEL CELL USING THE SAME

(75) Inventors: Tae-young Kim, Seoul (KR); Myung-dong Cho, Hwaseong-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1076 days.

(21) Appl. No.: 11/845,437

(22) Filed: Aug. 27, 2007

(65) Prior Publication Data

US 2008/0145744 A1 Jun. 19, 2008

(30) Foreign Application Priority Data

Dec. 15, 2006 (KR) .............................. 2006-129010

(51) Int. Cl.
*H01M 8/10* (2006.01)

(52) U.S. Cl. ........ 429/492; 429/405; 429/484; 429/493; 429/530; 429/532

(58) Field of Classification Search .................. 429/405, 429/484, 492, 493, 530, 532
See application file for complete search history.

(56) References Cited

U.S. PATENT DOCUMENTS

| | | | |
|---|---|---|---|
| 4,247,678 A | 1/1981 | Chung | |
| 7,232,876 B2 * | 6/2007 | Tamura et al. | 528/60 |
| 2005/0231894 A1 * | 10/2005 | Yoshida et al. | 361/502 |
| 2006/0137817 A1 * | 6/2006 | Ma et al. | 156/296 |
| 2006/0269817 A1 * | 11/2006 | Cho et al. | 429/33 |

FOREIGN PATENT DOCUMENTS

| | | |
|---|---|---|
| JP | 2004-273386 | 9/2004 |
| JP | 2007-035305 | 2/2007 |

* cited by examiner

*Primary Examiner* — Patrick Ryan
*Assistant Examiner* — Ben Lewis
(74) *Attorney, Agent, or Firm* — Lee & Morse P.C.

(57) ABSTRACT

An electrode for a fuel cell including a support and a catalyst layer formed on the support, wherein the catalyst layer comprises a supported catalyst and a polyurethane-based compound, wherein all or some of the polyurethane-based compound is synthesized from a polyol monomer where some or all of the polyol monomer is a polyol monomer that contains a phosphonyl group; a method of preparing the same; and a fuel cell including the same. The electrode for a fuel cell has excellent ion conductivity because it maintains stability at high temperature operation, and is capable of retaining phosphoric acid effectively even at high temperatures. A fuel cell can be prepared by using the electrode where the fuel cell can operate under these conditions of high temperature above 100° C. and no humidity and shows improved performance for generating electricity.

7 Claims, 2 Drawing Sheets

US 8,148,029 B2

ELECTRODE FOR FUEL CELL AND FUEL CELL USING THE SAME

CROSS-REFERENCE TO RELATED APPLICATION

This application claims the benefit of Korean Application No. 2006-129010, filed Dec. 15, 2006 in the Korean Intellectual Property Office, the disclosure of which is incorporated herein by reference.

BACKGROUND OF THE INVENTION

1. Field of the Invention

Aspects of the present invention relate to an electrode for a fuel cell and a fuel cell including the same, and more particularly, to an electrode for a fuel cell that has excellent ion conductivity and stability even at high temperatures because of the excellent features imparted by phosphoric acid loaded in the electrode, as well as a fuel cell including the same.

2. Description of the Related Art

Fuel cells are categorized into PEMFC (proton exchange membrane fuel cells), PAFC (phosphoric acid fuel cells), MCFC (molten carbonate fuel cells) and SOFC (solid oxide fuel cells), etc.

PEMFC fuel cells are anticipated to have wide use, for example, in standing devices, automobiles and portable devices, because of high output density, quick rise to operating voltage and high efficiency, etc. Research is underway to raise the operating temperature of existing PEMFC's from the current 80° C. to above 100° C. because a high temperature system has advantages as follows: (1) the electrochemical reaction at both electrodes becomes faster, (2) water management becomes easier, (3) the cooling system becomes simple because of the large difference in temperatures between a fuel cell stack and a refrigerant, (4) it is easy to recover waste heat, and (5) the fuel processor can be simplified because of the decrease in carbon monoxide (CO) poisoning.

However, the fundamental obstacle to a high temperature system is that a polymer electrolyte membrane is urgently required that has stability at a high temperature of about 150° C. while maintaining its proton conducting property. NAFION® (DuPont Corporation) is used as an electrolyte membrane in existing low temperature PEMFCs because NAFION® shows high ion conductivity in the water-absorbed state. NAFION® has also been used as an ion conductor and binder in electrodes because of its high conductivity. However, NAFION® is expensive, and water cannot be absorbed on NAFION® in the liquid state at a temperature of 150° C. so that the ion conductivity of NAFION® drops drastically. Accordingly, NAFION® is not attractive as a binder since it cannot serve as a proton conductor. Accordingly, for an electrode in a high temperature fuel cell system, a polymer material is required that can serve as a stable binder even for long operating times, and can enhance the electrode performance because of its inherent properties.

Currently, PTFE (polytetrafluoroethylene) or PVdF (polyvinylidenefluoride) are mainly used as binders in high temperature PEMFCs. In high temperature PEMFCs, liquid phosphoric acid is used as a proton conductor, and thus the performance of the electrode is greatly affected by the amount and distribution of phosphoric acid absorbed into the electrode. However, PTFE and PVdF are hydrophobic. Since a hydrophobic material used as a binder in an electrode serves as gas pathway, but also has the property of preventing the absorption of phosphoric acid, electrodes using a hydrophobic material have inferior performance and take too much time to reach maximum performance. Accordingly, a hydrophilic polymer material that is stable at high temperature is required as a binder

SUMMARY OF THE INVENTION

Therefore, an aspect of the present invention is to provide an electrode for a fuel cell that includes a hydrophilic binder that is stable even at high temperatures, has an excellent absorption rate for phosphoric acid, and thus is capable of maintaining high ion conductivity.

Another aspect of the present invention is to provide a fuel cell including the same.

An exemplary embodiment of the present invention provides an electrode for a fuel cell including a support and a catalyst layer formed on the support wherein the catalyst layer comprises both a supported catalyst and a polyurethane-based compound; the polyurethane-based compound is a polymerization product of a polyol monomer, diisocyanate and a chain extender; and all or some of the polyol monomer contains a phosphonyl group.

In accordance with an exemplary embodiment, the concentration of the phosphonyl group-containing polyol monomer may be 7 mole % to 100 mole % of total polyol monomer.

In accordance with another exemplary embodiment, the polyurethane-based compound may be included in a concentration of 0.1 to 50% by weight in the supported catalyst.

Another exemplary embodiment of the present invention provides a fuel cell including a cathode, an anode and an electrolyte membrane, wherein at least one of the cathode and the anode is the electrode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
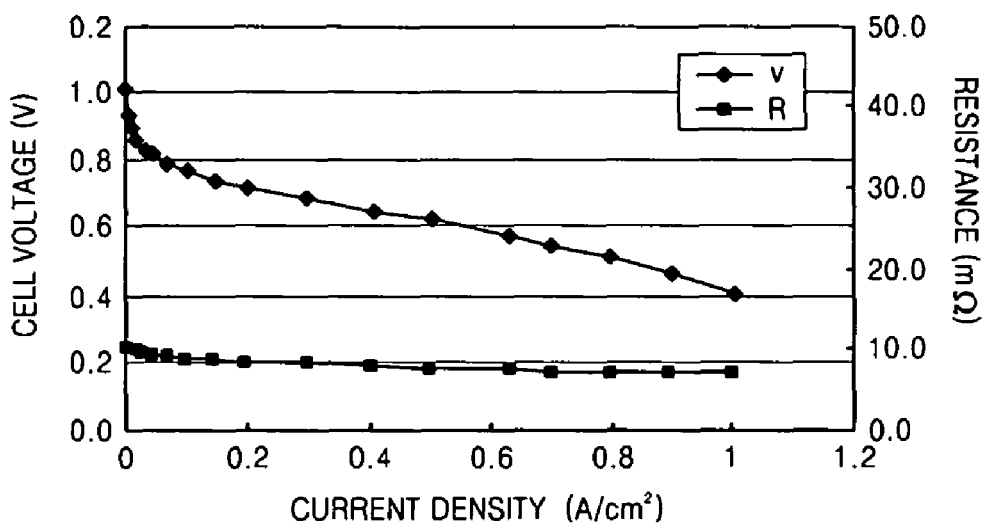
FIG. 1 is a graph showing the changes in the cell voltage and the resistance as functions of the current density of the fuel cell prepared by Example 1 of the present invention.

Reference will now be made in detail to the present embodiments of the present invention, examples of which are illustrated in the accompanying drawings. The embodiments are described below in order to explain the present invention by referring to the figures.

Aspects of the present invention use a hydrophilic polyurethane-based compound for use at high temperatures as some or all of a binder in at least one of a cathode and an anode of a fuel cell, thereby improving the absorption rate of phosphoric acid into the electrode and thus increasing the ion conductivity of the fuel cell.

Thus, an electrode for a fuel cell according to an exemplary embodiment of the present invention includes a support and a catalyst layer formed on the support, wherein the catalyst layer comprises a supported catalyst and a polyurethane-based compound; the polyurethane-based compound is a polymerization product of polyol monomer, diisocyanate and a chain extender; and some or all of the polyol monomer contains a phosphonyl group.

Aspects of the present invention substitute all or some of the total polyurethane-based compound with a polyurethane-based compound synthesized from the polyol monomer where some of the polyol monomer is the polyol monomer that contains the phosphonyl group, and thereby: immobilizing a catalyst layer on a support; simultaneously enhancing the catalyst layer's absorption rate for phosphoric acid used as a proton conductor because of the improved hydrophilicity; thus increasing catalyst availability; and finally enhancing the performance of the fuel cell. In the polyol monomer that contains the phosphonyl group, the phosphonyl group has been introduced to the main chain of the polyol in order to enhance the catalyst layer's affinity toward phosphoric acid. Thus, the phosphonyl group-containing polyol monomer enhances the electrode's ability to incorporate and transfer phosphoric acid and thus improves the electrode's ion conductivity.

In accordance with an exemplary embodiment of the present invention, the phosphonyl group-containing polyol monomer may be 7 mole % to 100 mole %, and preferably 7 mole % to 85 mole % of total polyol monomer. The concentration of the phosphonyl group-containing polyol monomer can be controlled within the range described above according to the degree of desired hydrophilicity.

The polyurethane-based compound may be included in concentrations of 0.1 to 50% by weight of the supported catalyst. If the concentration is less than 0.1% by weight, the desired hydrophilic effect cannot be obtained. If the concentration exceeds 50% by weight, phosphoric acid can be absorbed excessively within the electrode, and thus it becomes difficult to transport a fuel or a gas such as air, thereby dropping the performance of the fuel cell.

The polyol monomer used in preparing the polyurethane-based compound may be at least one selected from the group consisting of dimethylol butanoic acid (2,2-bis(hydroxymethyl)butyric acid), dimethylol propionic acid (2,2-bis(hydroxymethyl)propionic acid), poly(tetramethylene ether glycol) (polytetrahydrofuran or PTMEG), poly(propylene glycol) (PPG), and polycaprolactone diol (PCL).

The phosphonyl group-containing polyol monomer includes a compound represented by formula I below:

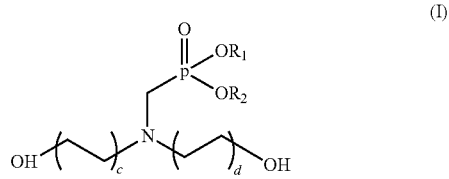

(I)

In the formula I, $R_1$ and $R_2$ are each independently a C1-C20 alkyl group and c and d are each independently an integer of 1 to 4.

A specific example of the polyol monomer that contains a phosphonyl group is {[bis-(2-hydroxyethyl)-amino]-methyl}-phosphonic acid diethyl ester represented by formula II below:

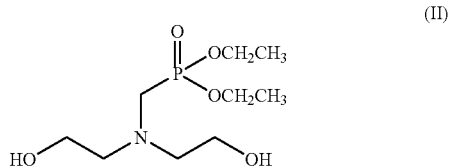

(II)

As used in this embodiment of the present invention, the concentration of the polyol monomer including the phosphonyl group-containing polyol monomer may be 70 to 90 parts by weight based on 100 parts by weight of the diisocyanate-based compound. If the concentration is less than 70 parts by weight, the polymerization is not sufficient, thereby generating unreacted material. If the concentration exceeds 90 parts by weight, the polyol monomer reacts in excess amounts.

In this embodiment of the present invention, the starting material, a diisocyanate-based compound used in synthesis of the polyurethane-based compound is an aliphatic diisocyanate-based compound, and in particular, at least one compound selected from the group consisting of isophorone diisocyanate and diisocyanate-based monomers. The average molecular weight of the polyurethane-based compound used in this embodiment of the present invention is 5,000 to 500,000, and may be about 10,000.

Further, in accordance with an exemplary embodiment of the present invention, the specific examples of the chain extender include ethylene diamine, etc. The concentration of the chain extender may be 10 to 20 parts by weight based on 100 parts by weight of the diisocyanate-based compound.

Water or N-methylpyrrolidone (NMP) is used as a solvent in the polymerization reaction, and the concentration thereof may be 100 to 400 parts by weight based on 100 parts by weight of the diisocyanate-based compound.

The yield of polyurethane is excellent when the total concentration of the unsubstituted polyol monomer and the phosphonyl group-containing polyol monomer and the concentration of the chain extender and the solvent are in the ranges described above in the reaction of synthesizing polyurethane.

In accordance with an exemplary embodiment of the present invention, the catalyst used in forming the catalyst layer is a supported catalyst made of a carrier and metal catalyst particles supported on such a carrier.

The metal catalyst particles constituting the supported catalyst include, but are not particularly limited to, particles of platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), lead (Pb) or a mixture thereof, and in particular, nano-sized particles of platinum and an alloy thereof may be used. For example, a Pt alloy catalyst such as Pt/C, PtCo/C and PtCr/C can be used as a cathode, and a Pt alloy catalyst such as Pt/C and PtRu/C can be used as an anode.

Carbon paper, carbon cloth, or carbon paper/cloth coated with a microporous layer is used as the support.

The method of preparing an electrode for a fuel cell is described as follows:

The polyurethane-based compound can be used as a suspension in water, or a solution in NMP. For the compound suspended in water, NMP is added thereto, the mixture is stirred for at least 24 hours at 70 to 90° C., and water is removed, and then the product is used in preparing an electrode. The concentration of the polyurethane-based compound may be 3 to 10% by weight. For the compound dissolved in NMP, NMP is further added to the solution to dilute to a concentration of 3 to 10% by weight, and then the product is used in preparing an electrode.

The polyurethane-based compound can be used selectively in both a cathode and an anode, or in either one of them.

A catalyst, a solvent and a polyurethane-based compound were mixed, and then the mixture is stirred to prepare a slurry. The slurry is coated on a support, and then is dried to prepare an electrode.

Thus, the electrode obtained from the process described above includes a support and a catalyst layer formed on the support, wherein the catalyst layer comprises a supported catalyst and a polyurethane-based compound.

An electrolyte membrane made of at least one polymer selected from the group consisting of polybenzimidazole, crosslinked polybenzimidazole, ABPBI, polybenzoxazine (PBOA), polyurethane and modified polytetrafluoroethylene (modified PTFE) is interposed between the cathode and the anode to prepare a fuel cell.

An acid is impregnated into the electrolyte membrane. A non-limiting example of the acid includes phosphoric acid. The concentration of the phosphoric acid may be, but is not limited to, 80 to 100% by weight, and in particular, 85% by weight of an aqueous solution of phosphoric acid.

Aspects of the present invention will be described in greater detail with reference to the following examples. The following examples are for illustrative purposes only and are not intended to limit the scope of the invention.

EXAMPLES

Synthesis Example 1

Preparation of polyurethane (the concentration of PYROL®-6 in which the mole % of the phosphonyl group-containing polyol monomer is 100 mole %)

80 parts by weight of PYROL®-6 (previously manufactured by Akzo Nobel Chemicals Inc., and now by Supresta), which is a phosphonyl group-containing polyol monomer and has an average molecular weight of 255, 100 parts by weight of isophorone diisocyanate, 10 parts by weight of ethylene diamine which is a chain extender, and 300 parts by weight of water which is a solvent were mixed, and the mixture was reacted at 60° C. to synthesize water-dispersible polyurethane.

Synthesis Example 2

Preparation of polyurethane (the concentration of FYROL®-6, a phosphonyl group-containing polyol monomer, is bonded to a phosphoric acid group is 10 mole % and the concentration of polytetramethylene ether glycol which is a polyol monomer is 90 mole %)

72 parts by weight of polytetramethylene ether glycol which has an average molecular weight of 1,000, 100 parts by weight of isophorone diisocyanate, 8 parts by weight of FYROL®-6, which is a phosphonyl group-containing phosphoric acid group and has an average molecular weight of 255, 10 parts by weight of ethylene diamine which is a chain extender, and 300 parts by weight of water which is a solvent were mixed, and the mixture was reacted at 60° C. to synthesize water-dispersible polyurethane.

Synthesis Example 3

Preparation of polyurethane (the concentration of PYROL®-6, a phosphonyl group-containing polyol monomer, is 20 mole % and the concentration of polytetramethylene ether glycol which is a polyol monomer is 80 mole %)

64 parts by weight of polytetramethylene ether glycol which has an average molecular weight of 1000, 100 parts by weight of isophorone diisocyanate, 16 parts by weight of FYROL®-6, which is a phosphonyl group-containing polyol monomer and has an average molecular weight of 255, 10 parts by weight of ethylene diamine which is a chain extender, and 300 parts by weight of water which is a solvent were mixed, and the mixture was reacted at 60° C. to synthesize water-dispersible polyurethane.

Example 1

Preparation of a Cathode 0.75 g of PtCo/C (TEC36E52, manufactured by TKK company) as a catalyst, and 3.5 g of NMP as a solvent were added to a vessel, and the mixture was stirred for 2 minutes with a high-speed agitator (AR-250). 9.6 g of NMP was added to 2 g of a suspension of the polyurethane-based compound prepared by Synthesis Example 2, and then the mixture was stirred for 12 hours at 80° C. to remove water, and then NMP was further added to dilute the mixture to a 4% solution. The diluted solution was added to the above mixture of PtCo/C and NMP and the mixture was further stirred for 2 minutes to prepare a slurry.

The slurry was coated by bar coating (#100) on carbon paper (SGL35BC), which was cut into a 7 cm×7 cm square, and then the solvent was removed by drying. The drying condition was drying for 1 hour at ambient temperature, then for 30 minutes in an oven at 80° C., for 30 minutes at 120° C., and finally for 10 minutes at 150° C., and then cooling the oven. Herein, the Pt load was about 1.402 mg/cm$^2$.

Preparation of an Anode 0.75 g of PtRu/C (TEC36E52, manufactured by TKK company) as a catalyst, and 3.5 g of NMP as a solvent were added to a vessel, and the mixture was stirred for 2 minutes with a high-speed agitator (AR-250). To this mixture, 5 g of 2.5% PVdF solution were added, and then the mixture was further stirred for 2 minutes to prepare a slurry.

The slurry was coated by bar coating (#100) on carbon paper (SGL35BC) cut into a 7 cm×7 cm square, and then the solvent was removed by drying. The drying condition was drying for 1 hour at ambient temperature, then for 30 minutes in an oven at 80° C., for 30 minutes at 120° C., and finally for 10 minutes at 150° C., and then the oven was cooled. Herein, the Pt load was about 1.180 mg/cm$^2$.

Preparation of MEA

For an MEA test, each electrode was cut into a 3.1 cm×3.1 cm square, and then 6 mg/cm$^2$ of 85% phosphoric acid were added to a cathode, and 2 mg/cm$^2$ of phosphoric acid were added to an anode, and then the electrodes were dried at 150° C. The cathode, an electrolyte membrane and the anode were laminated to prepare MEA. Crosslinked polybenzimidazole was used as the electrolyte membrane, and 85% phosphoric acid was impregnated for 40 minutes at 60° C. The impregnation rate was about 350%.

In order to prevent gases from permeating between the anode and the cathode, a main gasket, 200 μm Teflon membrane, and 20 μm Teflon sub-gasket membrane were overlapped at the electrode/electrolyte membrane interface.

The pressure applied to the MEA was controlled by using a torque wrench, and the MEA was assembled while the pressure was increased in step-wise fashion to 1, 2, and 3 Nm torque.

Example 2

A hydrophobic binder, PTFE, was further added in preparing the cathode of Example 1.

0.135 g of a 60% PTFE30J suspension were added to the slurry. Subsequent processes were the same as those of Example 1 until the coating and drying process, and the electrode after drying was heat-treated for at least 12 hours at 340° C. in a nitrogen atmosphere, and then was cooled to ambient temperature in the furnace. Subsequently, the anode and MEA were prepared in the same manner as in Example 1.

Comparative Example 1

A cathode, an anode and an MEA were prepared in the same manner as in Example 1 except that polybenzimidazole as a polymer binder was used in a 2.5% weight ratio of solid component in the cathode. The Pt load was about 1.980 mg/cm$^2$ for the cathode, and about 0.9 mg/cm$^2$ for the anode.

For a test of the performance of a fuel cell, the operation was performed at 150° C. with no humidity while flowing 250 cm$^3$ of air and 100 cm of hydrogen. The actual reaction area of the electrode was set at 2.8 cm×2.8 cm.

An I-V curve was obtained by measuring the cell voltage as it changed with increasing current density. Herein, the resistance value was evaluated by measuring impedance at 1 kHz.

FIG. 1 is a graph showing the changes in the cell voltage and the resistance as functions of the current density of the fuel cell prepared by Example 1. As can be seen in FIG. 1, when a fuel cell is prepared using a polyurethane-based binder according to the present invention, the fuel cell measures 0.686V at 0.3 A/cm$^2$ of current density for a 1.402 g/cm$^2$ Pt load in the cathode, and demonstrates a low resistance value of 8 mΩ.

Figure 2:
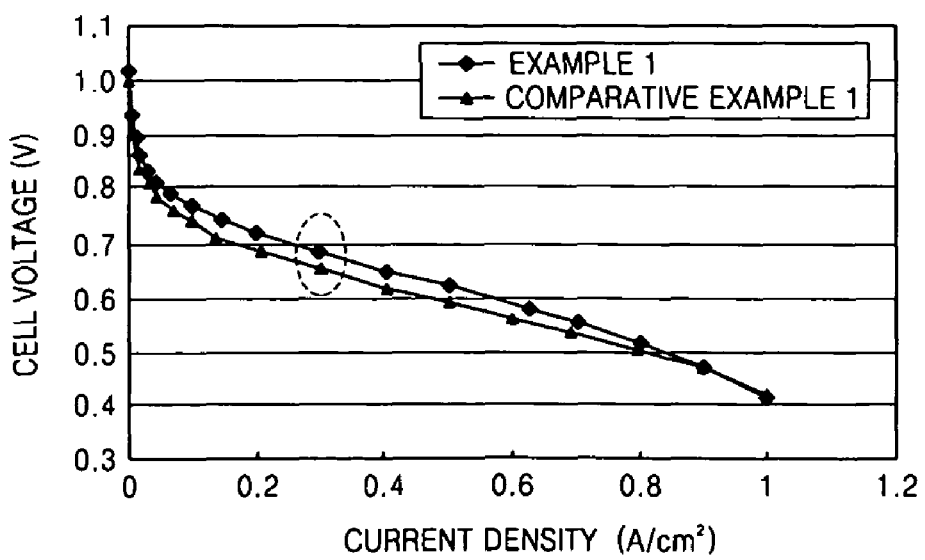
FIG. 2 is a graph showing the change in the cell voltage as functions of the current density of the fuel cells prepared by Example 1 and Comparative Example 1 of the present invention.

FIG. 2 is a graph showing the changes in the potential as functions of current density of the fuel cells prepared by Example 1 and Comparative Example 1. As can be seen in FIG. 2, the electrode of Example 1 applying the phosphoric acid group containing polyurethane-based compound as a binder measures about 30 mV higher at 0.3 A/cm$^2$ even though the Pt load of the standard polybenzimidazole electrode is high.

Figure 3:
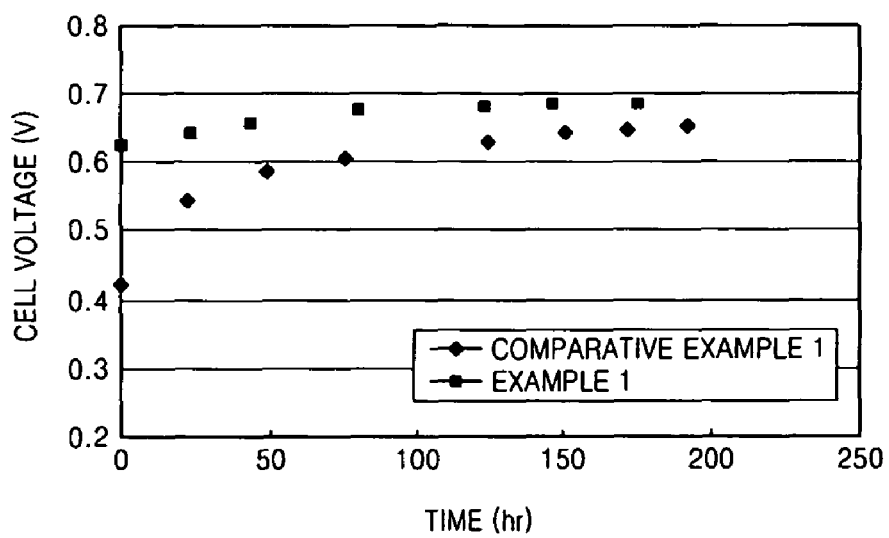
FIG. 3 is a graph showing the changes in the cell voltage of the fuel cells prepared by Example 1 and Comparative Example 1 of the present invention as functions of time.

FIG. 3 is a graph showing the changes in the cell voltage of the fuel cells prepared by Example 1 and Comparative Example 1 as functions of time. Herein, the current density is 0.3 A/cm$^2$. As can be seen in FIG. 3, the fuel cell of Example 1 shows a higher performance even from the initial operation since the phosphoric acid group containing polyurethane-based compound has an excellent ability of absorbing phosphoric acid.

Figure 4:
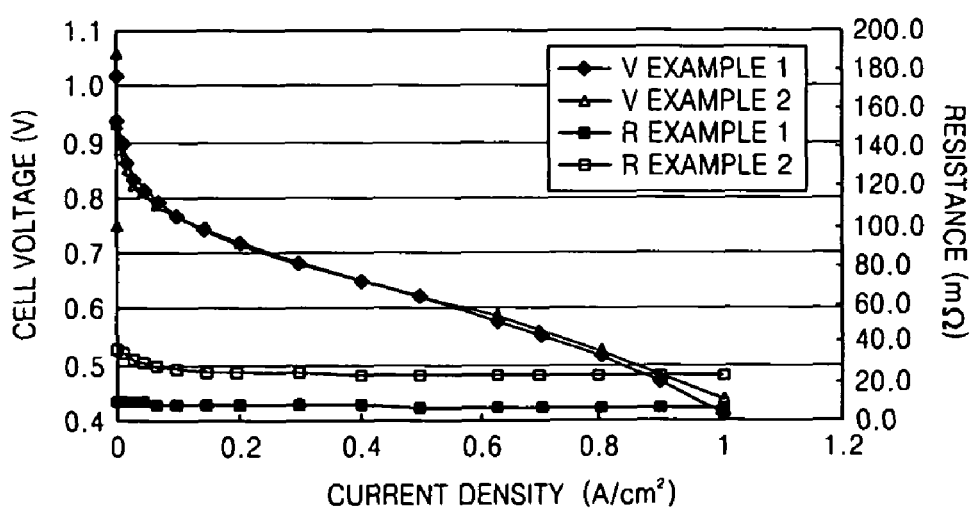
FIG. 4 is a graph showing the changes in the cell voltage and the resistance as functions of the current density of the fuel cells prepared by Examples 1 and 2 of the present invention.

FIG. 4 is a graph showing the changes in the cell voltage and the resistance as functions of current density of the fuel cells prepared by Examples 1 and 2. As can be seen in FIG. 4, the fuel cells according to the present invention show generally similar performance; however, at high current where the electrode is likely to be flooded, the electrode incorporating PTFE shows somewhat improved performance.

Meanwhile, when comparing the Tafel slopes of Examples 1 and 2 shown in Table 1 below, it can be seen that the Tafel slope of the electrode incorporating PTFE is somewhat lower, suggesting that the concentration of phosphoric acid around the electrode catalyst is less because of the hydrophobic PTFE. From these results, it can be seen that the ability of an electrode to absorb phosphoric acid can be controlled according to the purpose through an appropriate ratio between the phosphoric acid group containing polyurethane-based compound, which is a hydrophilic binder, and a hydrophobic binder.

TABLE 1

| Sorting | Tafel slope (mV/dec) |
|---|---|
| Example 1 | 116.84 |
| Example 2 | 97.06 |

The fuel cell incorporating a hydrophilic polyurethane binder according to an aspect of the present invention can provide a higher cell potential at low current density (≦0.3 A/cm$^2$), which is a typical operating condition for a home fuel cell, take a short time to reach optimum performance, and maintain high ion conductivity because it has excellent thermal stability and is capable of retaining phosphoric acid effectively even at high temperatures by using the phosphoric acid group bonded to a polyol, which is a flame retardant material, in preparing the binder.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a fuel cell, the electrode comprising:
a support layer; and
a catalyst layer formed on the support layer, wherein:
the catalyst layer includes a supported catalyst and a polyurethane-based compound,
the polyurethane-based compound is a polymerization product of polyol monomer, a diisocyanate-based compound and a chain extender, and
all or some of the polyol monomer is a polyol monomer that contains a phosphonyl group,
the concentration of the phosphonyl-group containing polyol monomer is 7 mole % to 85 mole % of total polyol monomer, and
the concentration of the polyurethane-based compound in the catalyst layer is 0.1 to 50% by weight of the supported catalyst in the catalyst layer.

2. The electrode for a fuel cell of claim 1, wherein the phosphonyl group-containing polyol monomer is a compound represented by formula I below:

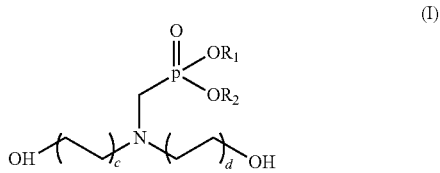

(I)

wherein $R_1$ and $R_2$ are each independently a C1-C20 alkyl group and c and d are each independently an integer of 1 to 4.

3. The electrode for a fuel cell of claim 2, wherein the phosphonyl group-containing polyol monomer is a monomer represented by formula II below:

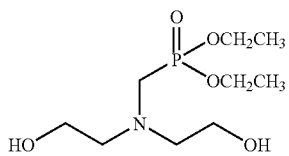

(II)

4. The electrode for a fuel cell of claim 1, wherein the concentration of the polyol monomer including the polyol monomer that contains the phosphonyl group is 70 to 90 parts by weight based on 100 parts by weight of the diisocyanate-based compound.

5. The electrode for a fuel cell of claim 1, wherein the diisocyanate-based compound is isophorone diisocyanate or a diisocyanate-based monomer.

6. The electrode for a fuel cell of claim 1, wherein the chain extender is ethylene diamine, and the concentration of the chain extender is 10 to 20 parts by weight based on 100 parts by weight of the diisocyanate-based compound.

7. A fuel cell including a cathode, an anode and an electrolyte membrane, wherein at least one of the cathode and the anode are the electrodes according to claim 1.

* * * * *